(12) United States Patent
Dahlström et al.

(10) Patent No.: US 6,428,452 B1
(45) Date of Patent: Aug. 6, 2002

(54) ASSEMBLY ROBOT FOR WING

(75) Inventors: Per Dahlström, Linköping; Håkan Andersson, Skänninge; Anders Högne, Atvidaberg; Ronnie Stensson; Roger Holmstedt, both of Linköping; Johan Carlsson, Hägersten; Per Benkowski, Uppsala, all of (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 09/646,525

(22) PCT Filed: Feb. 22, 1999

(86) PCT No.: PCT/SE99/00237

§ 371 (c)(1),
(2), (4) Date: Nov. 20, 2000

(87) PCT Pub. No.: WO99/47415

PCT Pub. Date: Sep. 23, 1999

(30) Foreign Application Priority Data

Mar. 19, 1998 (SE) ................................. 9800928

(51) Int. Cl.[7] ......................... B23Q 3/157; B23P 19/00; B21D 39/03; B21J 15/02
(52) U.S. Cl. ............................. 483/1; 29/33 J; 29/33 K; 29/34 B; 29/407.1; 318/568.11; 382/141; 483/13; 483/56; 483/901; 700/250; 700/253
(58) Field of Search .................. 483/1, 55, 56, 483/901, 13; 408/1 R; 700/166, 186, 253, 250, 192; 29/33 J, 33 K, 34 B, 430, 720, 431, 791, 792, 243, 53, 407.09, 407.1; 219/121, 78; 227/51; 318/568.11; 382/141

(56) References Cited

U.S. PATENT DOCUMENTS

| 4,310,964 | A |   | 1/1982  | Murphy |
| 4,359,815 | A | * | 11/1982 | Toyoda ........................ 483/901 |
| 4,885,836 | A | * | 12/1989 | Bonomi et al. ............. 29/34 B |
| 4,892,992 | A | * | 1/1990  | Akeel et al. ........... 219/121.78 |
| 5,142,764 | A |   | 9/1992  | Whiteside |
| 5,477,596 | A |   | 12/1995 | Schlosstein et al. |
| 5,664,311 | A |   | 9/1997  | Banks et al. |
| 5,768,768 | A | * | 6/1998  | Best .............................. 29/33 J |
| 6,237,210 | B1| * | 5/2001  | Stoewer et al. ............... 29/430 |
| 6,254,317 | B1| * | 7/2001  | Chang ......................... 408/1 R |

FOREIGN PATENT DOCUMENTS

GB    2 276 600 A    10/1994

* cited by examiner

Primary Examiner—William Briggs
(74) Attorney, Agent, or Firm—Swidler Berlin Shereff Friedman, LLP (57) ABSTRACT

A method and a device for assembling an air-craft wing incorporating at least two of the operations drilling, riveting and fitting of anchor nuts (20), where a robot (7) is mobile relative to the wing in a plane parallel to the wing and where the robot (7) is equipped with an arm (9) designed to accommodate a tool holder (15), where the tool holder (15) is primarily equipped with tools for performing a single work operation, whereby the robot is moved so that the robot arm (9) is positioned at the first work position on the aircraft wing unit, where the robot (7) carries out the first work operation at the said first work position, where the robot arm (9) is manoeuvred in the correct order to new work positions on the wing unit within a work area (10) reachable by the robot arm (9), and carries out the first work operation at these new work positions.

17 Claims, 8 Drawing Sheets

ASSEMBLY ROBOT FOR WING

TECHNICAL FIELD

The invention presented below concerns a method for the assembly of a wing according to the introduction to claim 1. Additionally, the invention involves a device for the assembly of a wing used in the implementation of the said method according to the introduction to the independent claim for the device.

STATE OF THE ART

A wing of an aircraft is normally constructed as a structure of spars and ribs, which is covered by a wing skin. The term stay is used below to include both the terms spars and ribs. The wing skin is generally fixed to the stays by means of screws. The stays underlying the wing skin have been formed in order to give the wing its profile and thus the final profile of the wing is formed when the wing skin is fixed to the underlying stay.

The stays supporting the wing skin are constructed of, for example, light metal such as aluminium, or, as is now common, composite. These stays consist of U-shaped sections with both upper and lower flanges against the upper and lower wing skin respectively. The flanges follow, as mentioned above, the surface profile of the wing in the stay's vertical plane through the wing.

Since the wing skin is fastened by a large number of screws to the said flanges of the stays this assembly requires some type of nut or fixed thread in the dolly underlying the wing skin, that is in the flanges of the stays. With present-day technology this is performed by so called anchor nuts being fixed to the flanges of the stays on the side which faces away from the wing skin of the wing. Furthermore, the current technique is such that the anchor nuts have holed lugs which are suitably riveted to the inside of the flange. Supplying the frame, i.e. the stay, in this way with a thread in each position where a screw is to fix the wing skin to the frame makes fitting of the wing skin a simple procedure.

Assembly of the wing involves a number of steps. In the initial steps the frame is built using a jig, i.e. all of the wing's stays are fixed together to produce the said frame. The skin of the wing is applied temporarily to the frame, after which, in the third step, the wing skin and frame are drilled jointly. This drilling means that holes for the wing skin's mounting screws are drilled through the wing skin and the flanges of the stays in the frame during one and the same operation. In this way the exact positions are determined for the anchor nuts which in the subsequent assembly stage are to be fixed to the frame. In this stage of the assembly the wing skin has been removed, so that the operation of fixing the anchor nuts can be performed.

The work involving the fixing of the anchor nuts in position is very time-consuming when carried out manually. The nuts vary in type, so that holes for riveting of the lugs of the nuts have to be made and adjusted to the type of nut. Then the lugs of the nuts are riveted to the frame, that is to the flange of the stay. Drilling of the rivet holes must be done in the correct position so that the nut hole is aligned with the previously drilled screw hole in the frame. The holes for the rivets are of different diameters. The rivets vary in type according to the type of nut. All of this work requires a lot of time since thousands of anchor nuts must be fixed in position.

There are, on the market, solutions for the automatization of the drilling and riveting of anchor nuts. In large-scale production of aircraft wing units as described above there is one solution used whereby a clamp for handling tools has a range such that the tool at the end of both arms of the clamp can be extended in over the wing unit and reach every point of the same and is thereby capable of performing work operations on the top side and underside of the wing simultaneously. This process is automated, the operations being carried out according to a program. Such a solution, however, is expensive and requires large series for it to be profitable.

According to another method, a robot, which is able to move along the wing on a carriage, operates by looking for work positions using its robot hand, on which a automatic tool machine is mounted. The automatic tool machine grips the flange and holds the piece to be machined to the automatic tool machine. The automatic tool machine is constructed in such a way that, in a revolving fashion, it can select the tools in the correct order so as to carry out all the stages in the operation necessary for fixing an anchor nut in position. In this case the turret contains tools for making rivet holes, a device for transporting anchor nuts and placing them in the correct position, and a riveting tool for selecting the correct type of rivet and performing the riveting operation. An automatic tool machine of the said type designed for executing all steps in the operation is sophisticated and very expensive. Furthermore, having the tool holder secured in a turret means that the equipment is heavy and clumsy, thereby reducing the accessibility of the tool.

Another method which has been employed uses ordinary floor or carriage mounted six axle robots with a large range of movement which allows the robot to reach large areas of a wing. According to this method the robot, in accordance with a program, chooses a tool holder, supplies the tool holder with the correct tools, searches for the next work position, performs the first work operation, searches for a new work position, performs the first work operation again, and so on within a specified work area. When the first work operation is completed at all programmed positions the robot fetches and attaches to itself the next tool holder with the requisite tools, and performs all the elements of a second work operation. In trials using this method it has, however, proved difficult to achieve the exactness demanded in positioning the tool to the wing stays. Furthermore, neither does this type of robot with long arms and large manoeuvre area have the stability that is necessary, since there are large forces present between the mounted tool and the wing profile during certain work operations.

In order to find a solution to the above difficulties and, furthermore, to achieve an economically viable level of automatization for the assembly of a wing according to the description a new method and a new device for the assembly of a wing are presented here.

DESCRIPTION OF THE INVENTION

The invention constitutes a method and a device for the assembly of a wing of an aircraft. In the said assembly the wing skin is fixed to the wing frame using fasteners. The wing frame is built up of an number of stays with flanges to which the wing skin is secured. The fasteners are generally in the form of screws, although other types of fasteners are also possible. Fitting of the wing skin using fasteners involves various operations which have to be performed on the frame. Examples of such operations, in the case where the fasteners are composed of screws that are threaded into anchor nuts in the frame, are drilling of rivet holes, fitting of anchor nuts and riveting. Simultaneous drilling of the wing skin and frame to make screw holes is another example of an operation that can be performed according to the aspect of the invention.

According to an aspect of the invention in question a method for the assembly of a wing as specified in the independent method claims is presented.

According to a further aspect of the invention in question a device for the assembly of a wing as specified in the independent device claims is presented.

An advantage of using the method or the device according to the invention is that a robot with a relatively limited range of movement can be used. Thus, for example, a robot with an arm moved by ball screws can be used. This type of robot has a high degree of precision in locating work positions and can, in addition, withstand large tool forces, which produces stability when the various operations are being performed.

An additional advantage is that different tool holders are used for different operations. Such tool holders are relatively inexpensive and uncomplicated.

EMBODIMENTS OF THE INVENTION

A number of preferred embodiments are described below with the aid of the figures.

As mentioned above the invention is intended for the automatization of certain operations in the assembly of a wing 1, where the assembly of the stays 3 which makes up the wing frame 2 has already been completed. The wing frame is, in this example, mounted in a moveable jig, allowing the jig to be moved between different work stations where various steps of the assembly are performed. The wing is mounted vertically in the jig, which means that the plane of the wing is positioned more or less vertically. Close to the wing 1 and essentially parallel to the wing there is a rail 4. On the rail 4 a carriage 5 can be moved mechanically to and fro along the wing 1. The carriage 5 is equipped with a column 6. On one side of the column a vertically mobile robot 7 is mounted. The robot 7 runs vertically on a second rail 8 fitted on the side of the column 6. By moving the carriage 5 along the wing 1 on the first rail 4 and moving the robot 7 vertically on the second rail it is thus possible for the robot arm 9 to reach every point on the wing surface. Normally, however, the robot 7 is moved in steps, so that after being moved it can reach all positions within a work area 10, which fully or partly covers a subset of the aircraft wing unit. The robot 7 which is used according to an embodiment of the invention has a relatively limited range of movement. This does not constitute a disadvantage, since the robot 7 described above can be moved between the different work areas 10. On the contrary, this makes it possible to choose a very stable type of robot. According to the example a robot 7 has been chosen in which the robot arm 9 is manoeuvred with three ball screws 11, 12, 13. This affords very good stability and the capacity to handle large tool forces when using different tools, while allowing the robot arm to move to new work positions with sufficient speed.

Figure 4:
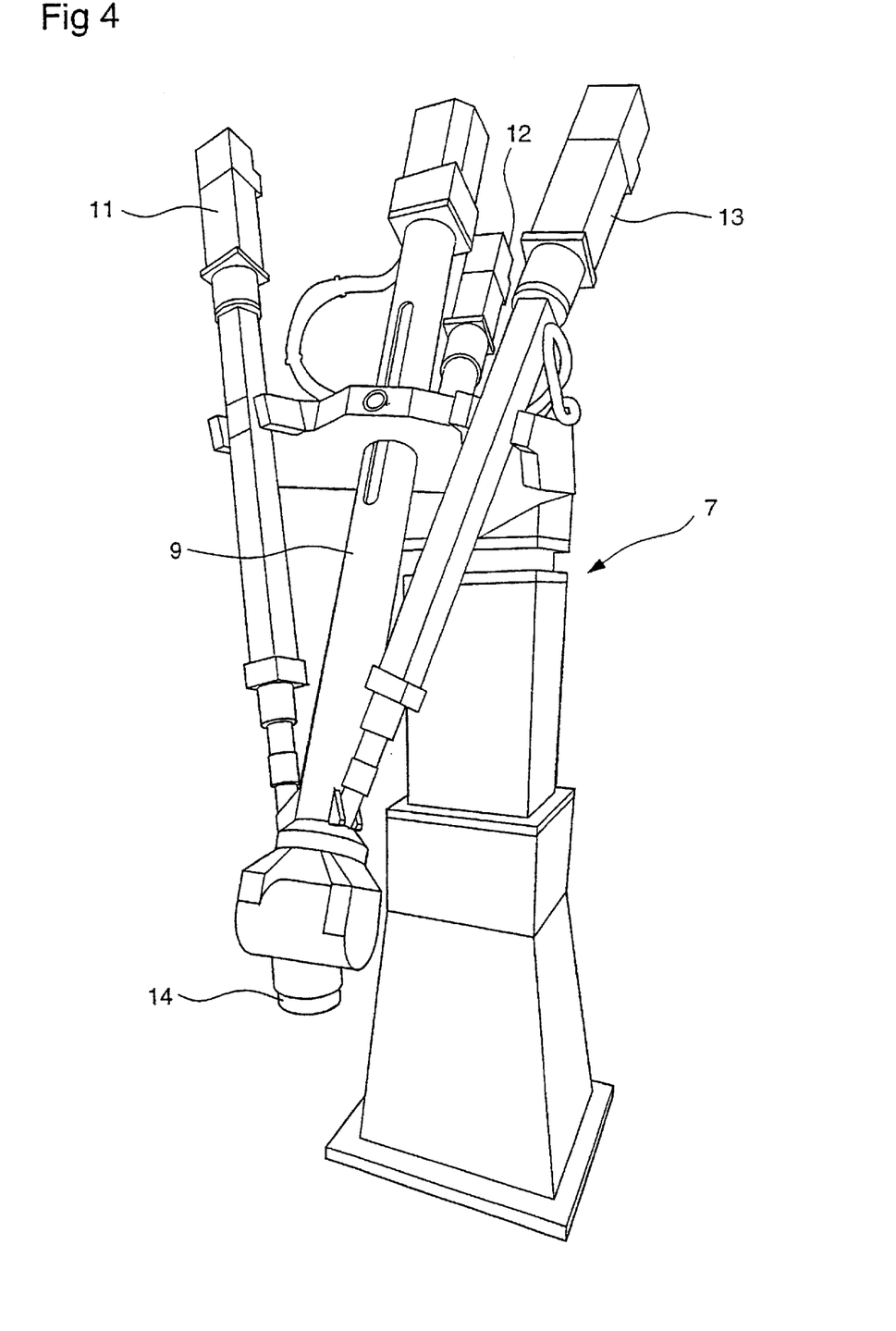
FIG. 4 shows a robot with a ball screw mechanism, which, according to an embodiment of the invention, is employed in the automatic assembly machine.
Figure 6:
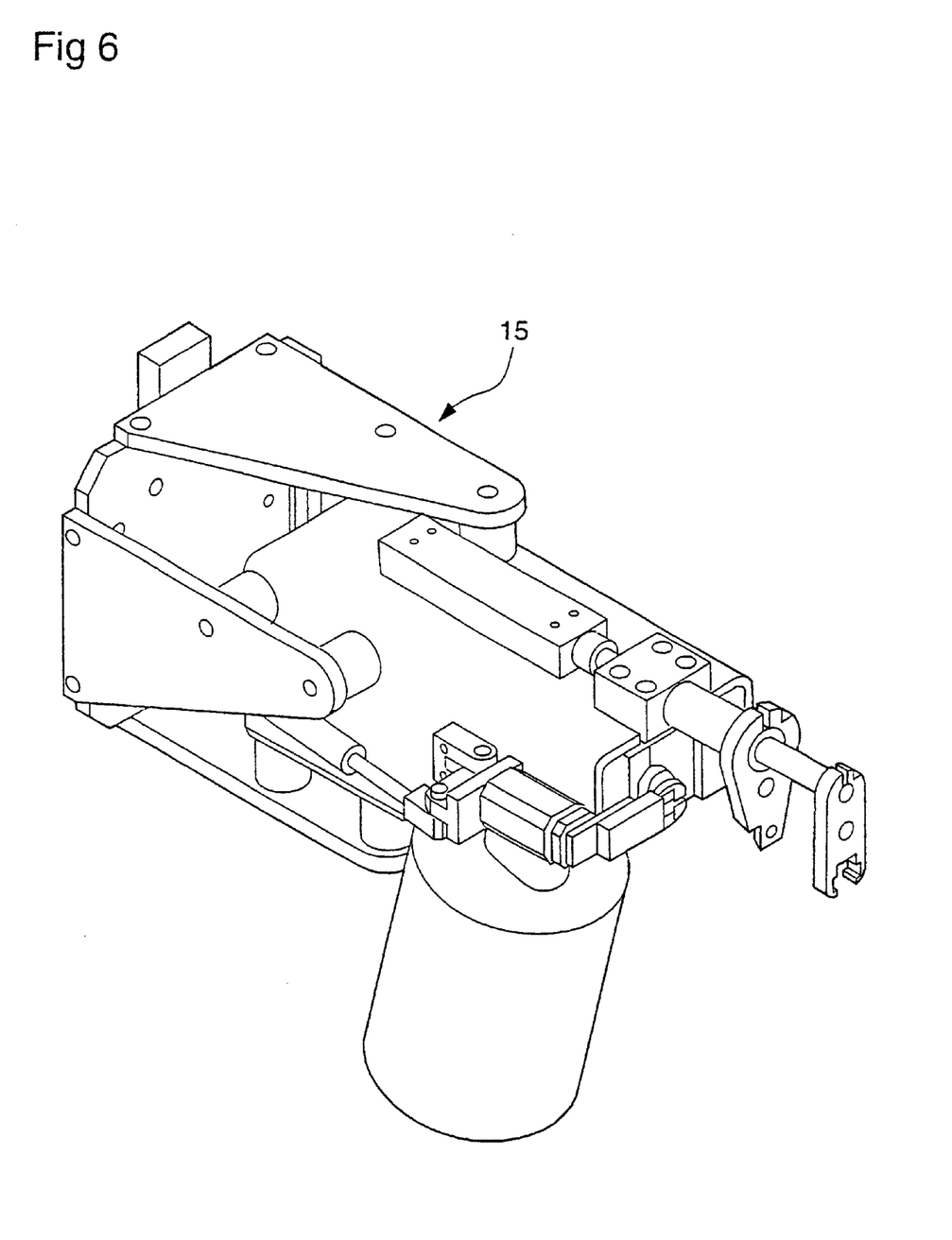
FIG. 6 illustrates an example of a tool holder for the robot in the automatic assembly machine, in this case a tool holder for fitting the actual anchor nuts.

The end of the robot arm 9 is equipped with a changing plate 14, which can accommodate different types of tool holder 15.

Figure 7:
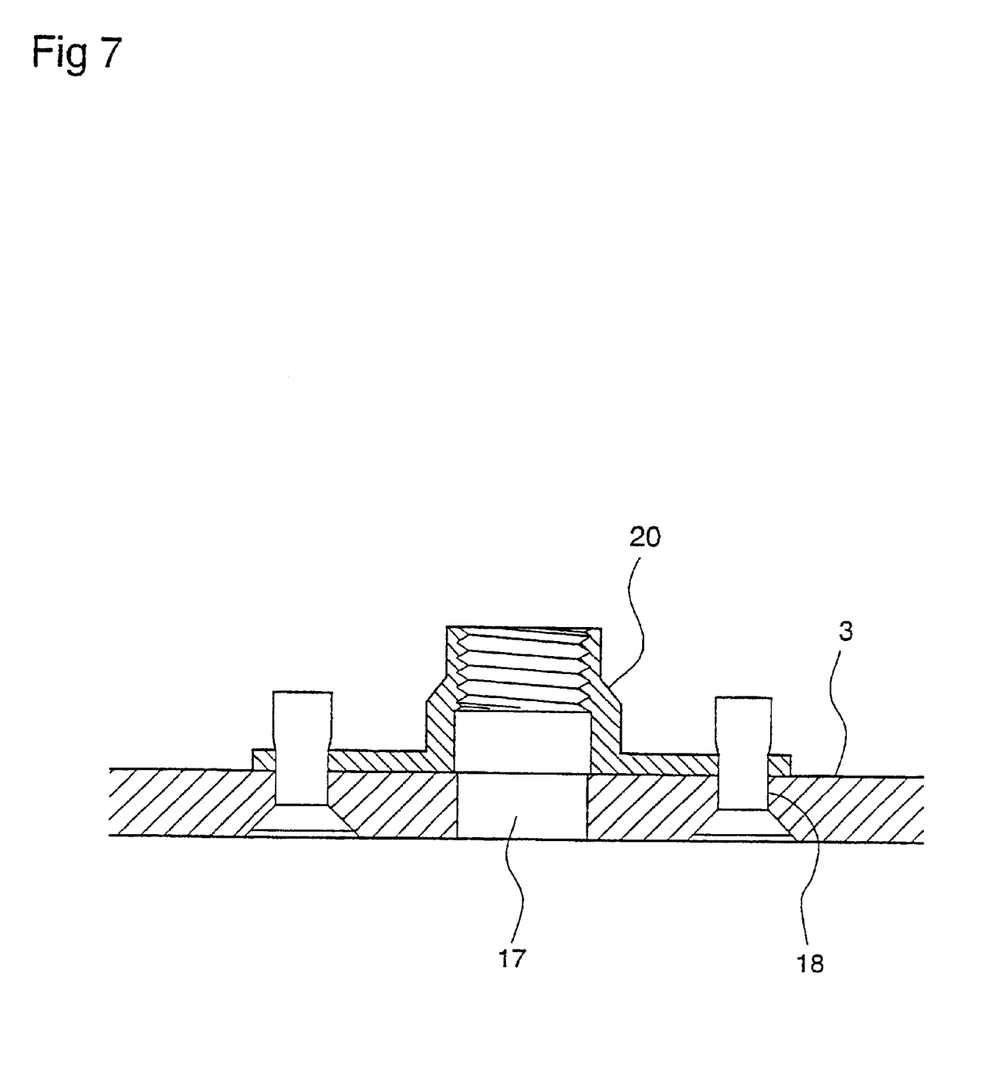
FIG. 7 shows schematically an example of an anchor nut riveted to a flange of a wing stay.
Figure 8:
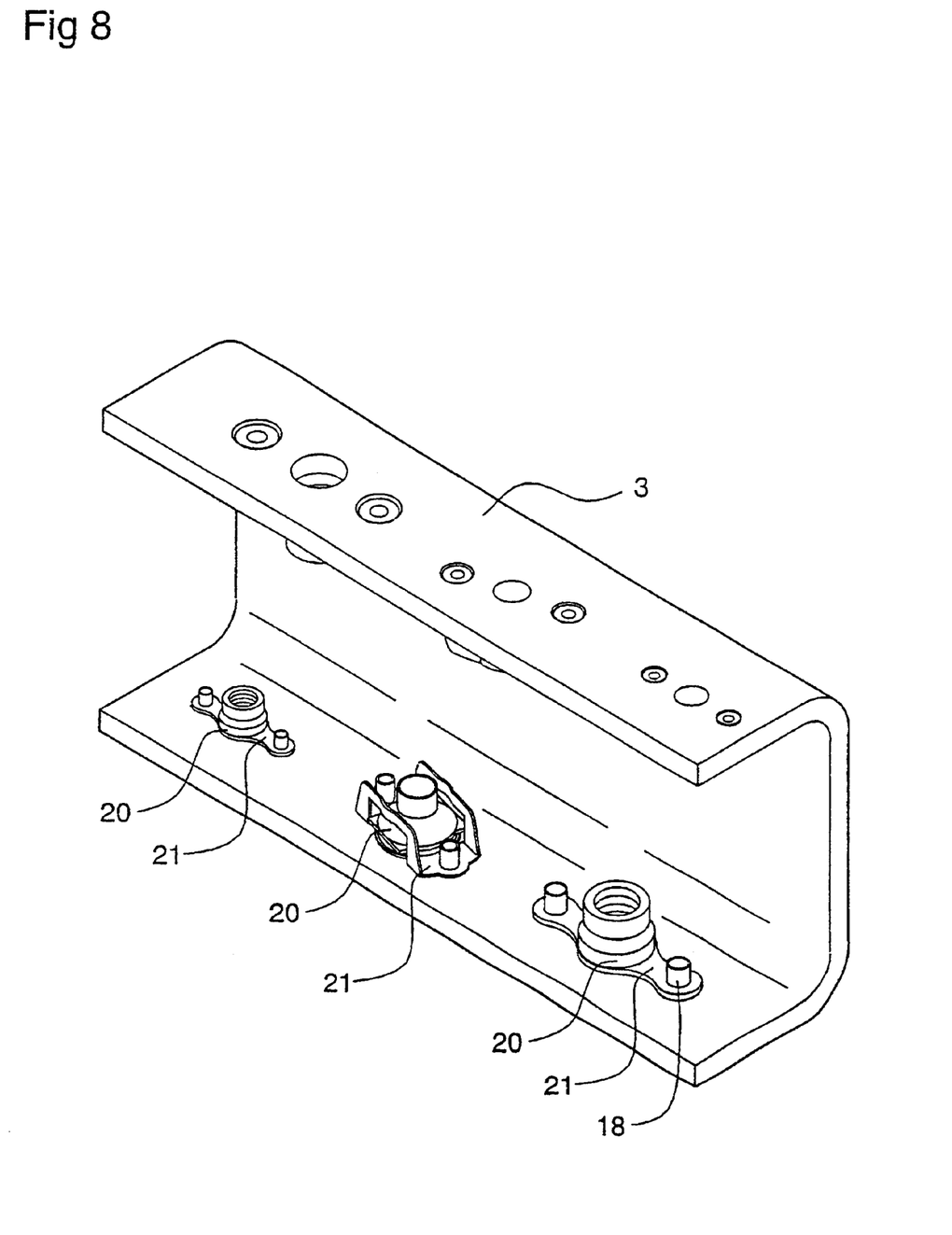
FIG. 8 shows a part of a wing stay, where some anchor nuts of various types are shown fitted.

The operations which are most suited for the robot 7 to perform are simultaneous drilling of the wing skin 16 and frame, making of holes intended for screws which fix the wing skin 16 to the frame 2, measuring of positions of already drilled holes 17 where the anchor nuts are to be fixed exactly in front of the said holes 17, drilling of rivet holes 18 in the flanges of the stays for the lugs 21 of the anchor nuts 20, fitting and riveting of the anchor nuts 20 with rivets which fasten the lugs 21 with the flanges of the stays at the rivet holes 18, screwing of mounting screws for fixing of the wing skin 16 to the frame. For at least one of the above operations a separate tool holder 15 is needed. The tool holder is meant to be changed after execution of the operations for which the tool holder is tailored and can be changed automatically by the robot itself by having the tool holders 15 stored in a magazine for tool holders close to the wing. The tool holders 15 are fitted on the robots 7 changing plate 14. An obvious advantage of the above arrangement is that the tool holders are uncomplicated and are intended primarily for one task, which means that they are simple and inexpensive, making the complete automated process attractive from a production point of view.

Below is a description of the process for the automatic execution of successive operations in the assembly of the wing according to the example of the embodiment of the invention.

Figure 5:
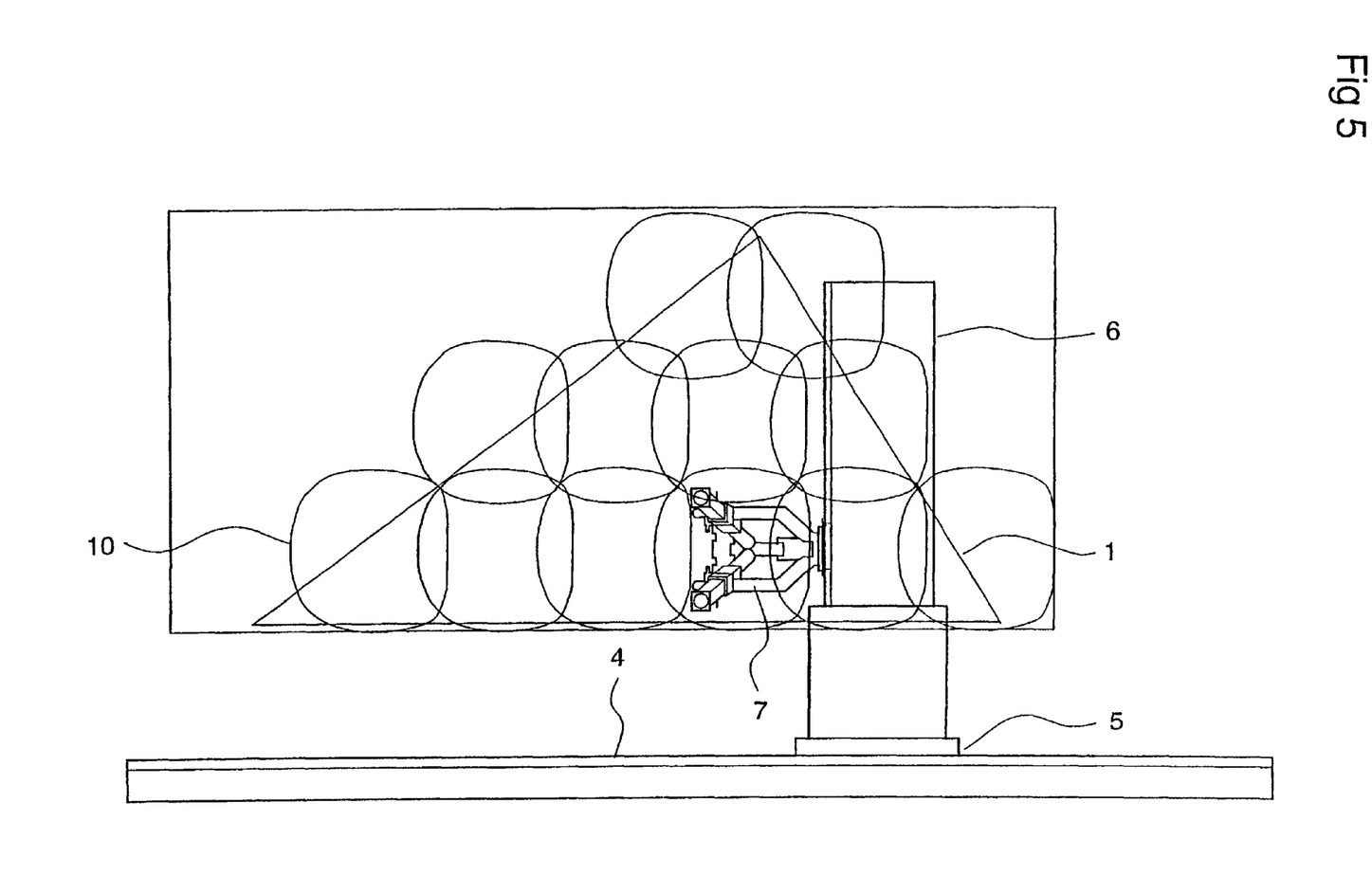
FIG. 5 depicts the division into a number of work areas for the robot, where the work areas are arranged to cover virtually the complete wing.

In a memory in the central unit 24 there is matrix stored data on every anchor nut of the entire wing unit, their positions, the dimensions of the centre holes, type of anchor nut, rivet hole position in relation to the centre hole, rivet type, the dimension of the holes for the rivets, the thickness of the material at the respective holes, the wing skin's thickness at each anchor nut and so on. The wing unit is divided into work areas 10. In the said memory the stored data is divided into one matrix for each side of the wing.

Figure 1:
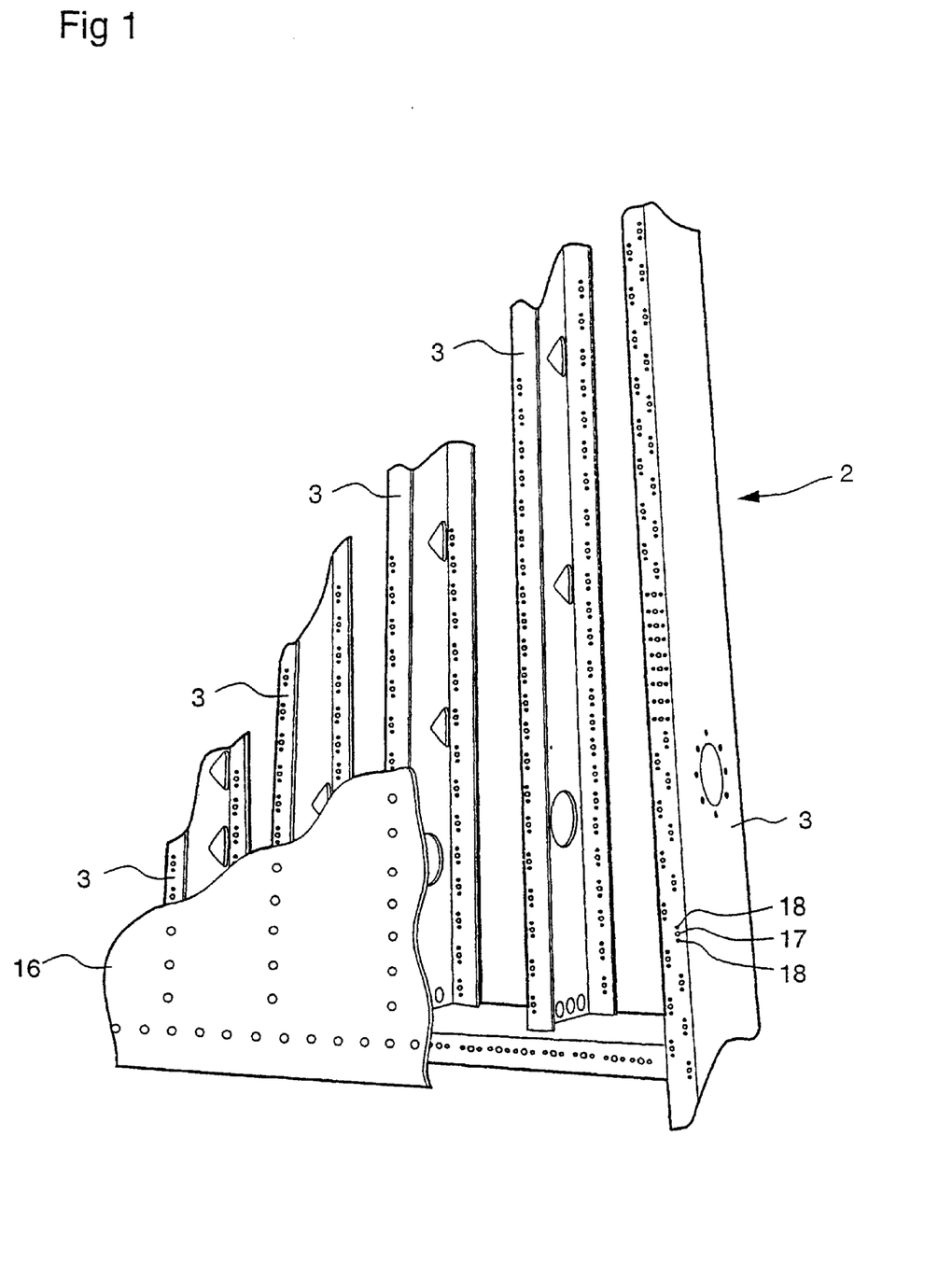
FIG. 1 illustrates a section of a frame of a wing with stays according to the description.

The operation involving drilling centre holes 17 for anchor nuts is not dealt with here, which, however, does not mean that this operation cannot be performed by means of the automatic assembly machine according to the invention. It is assumed here that these centre holes 17 are already drilled in the frame 2.

Figure 2:
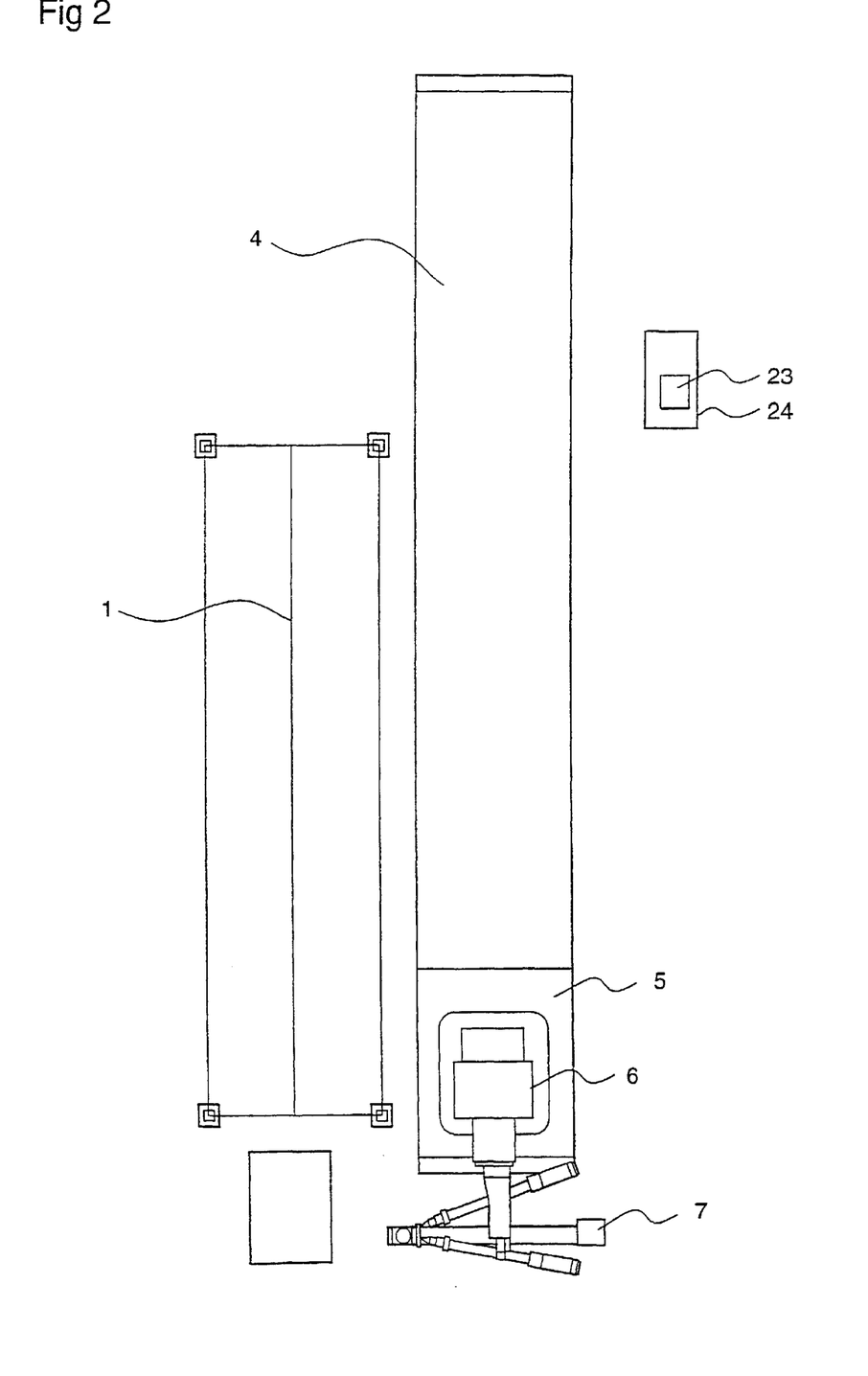
FIG. 2 shows schematically a view of the automatic assembly machine from above.
Figure 3:
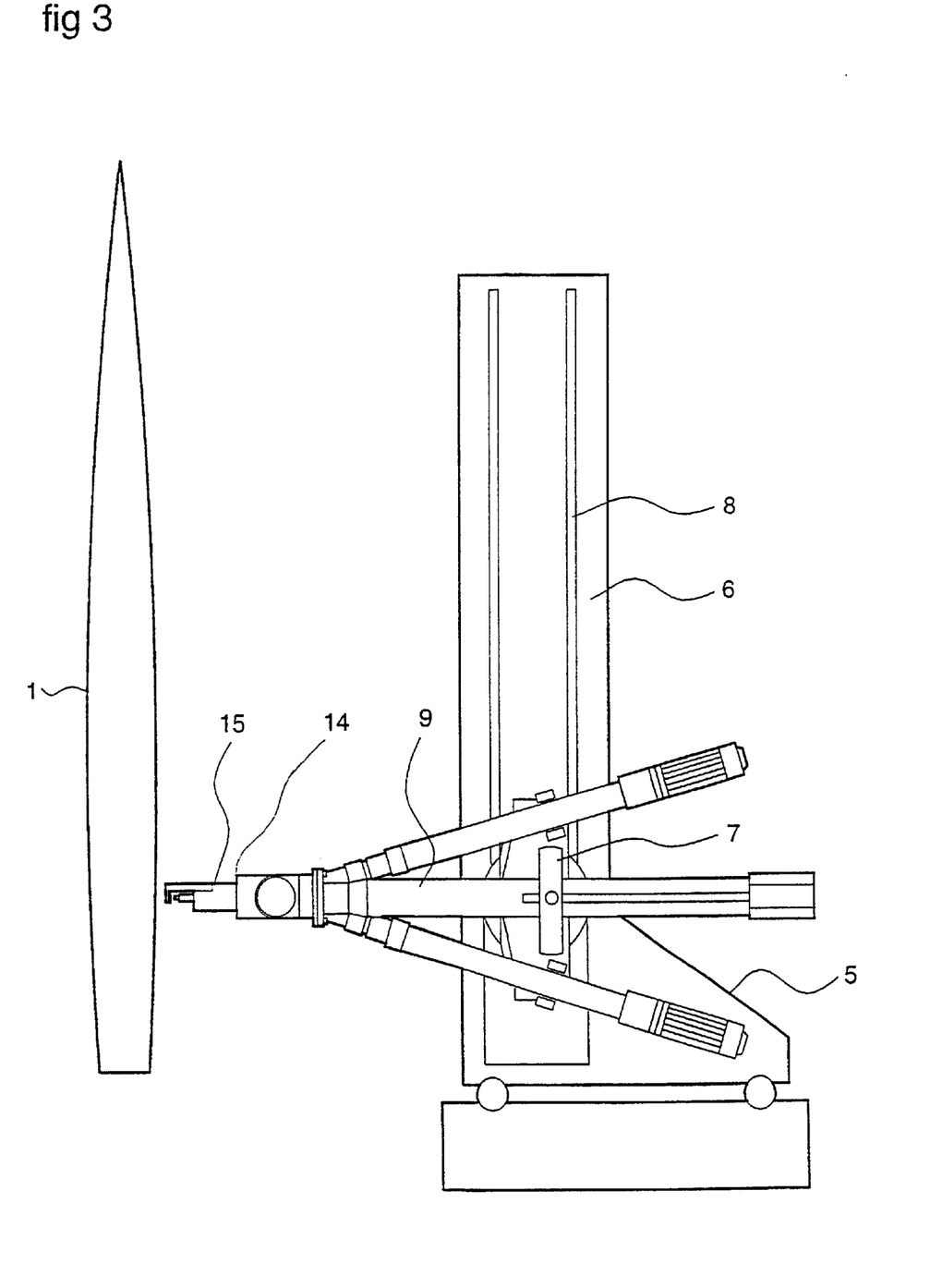
FIG. 3 shows schematically a lateral view of the automatic assembly machine according to the description, where a robot is shown laterally mounted on a moveable column.

According to a program in the central unit 24 of the automatic assembly machine a new operation is initiated when the carriage 5 and the robot 7 are moved along the tracks 4 and 8 to the magazine that stores the tool holder 15. There, the robot 7 exchanges the tool holder, by removing the existing tool holder 15 from the shunting plate 14, placing the previous tool holder in the magazine and attaching a tool holder 15 for the new operation to the changing plate 14. After that, the program commands the robot to position itself within the first work area 10.

For the operation involving drilling of rivets 18 at the position for the first anchor nut within the work area, the tool holder 15 is equipped with a drill the dimension of which is in accordance with the information in the memory on the first anchor nut position. Using a sensor in the tool holder in question, the robot arm searches for the exact position of the centre hole 17 for the first anchor nut 20. By reading the information in the memory matrix a drill is centred in position for drilling of each rivet hole 18 associated with the first type of anchor nut. The rivet holes 18 are drilled. Likewise, the drilling of rivet holes 18 proceeds according to the program for all rivet holes within the first work area 10.

At this stage there are two alternatives to choose between. Either the same operation 10 is performed, that is to say drilling of rivet holes 18 for all work areas, or all operations within a work area are completed before the robot is given the command to move to a new work area 10. Which method is chosen is immaterial. A third alternative involves a combination of these two methods. In other words, it is possible to program the automatic assembly machine to carry out the work in the sequence of one's choice.

It is assumed here that the robot 7 continues the work within the work area and is followed by the next operation. The robot 7 is then commanded to move to the magazine so as to deposit the tool holder 15 for drilling and fit the tool holder for carrying out the subsequent stage of the operation, which in this example involves fitting of the actual anchor nut 20. The tool holder 15 is now equipped with a tool in the form of a gripping appliance for positioning and holding an anchor nut in the correct position during the riveting operation, as well as tools for riveting of the anchor nut to the rivet holes 18 made in the previous operation. By reading in the memory matrix the automatic machine obtains information on the type of anchor nuts 20 and type of rivets for these. The robot 7 has access to and can reach a pick-up point where the tool holder 15 collects anchor nuts 20 and matching rivets. The tool holder centres the anchor nut 20 to the centre hole 17 on the inside of the stay's 3 flange and rotates the anchor nut, if necessary, to the angle read from the data in the memory in order to position the anchor nut lugs exactly in front of the respective associated rivet holes 18. At this stage a rivet is moved forward with a tool for riveting in the tool holder. The riveting operation is executed. The robot arm 9 is moved to the position, read from the memory, of the second rivet hole 18 of the same anchor nut 20, so that riveting of the anchor nut's other rivet can be executed. The fitting of anchor nuts to the other positions within the work area continues in a similar way. When all anchor nuts 20 within a work area 10 are fitted the procedure is repeated following this example for the remaining work areas 10 until all anchor nuts have been fitted to the side of the wing where the work is being performed according to the description. The wing can then be turned so that the same assembly work can be performed on the other side of the wing. An alternative would be to use two automatic assembly machines simultaneously, one on either side of the wing.

After completion of the operations presented above the work continues by fixing the wing skin to the frame by means of screws which fasten the wing skin to the frame, the screws being threaded into the accompanying nuts. This operation can also be done by the automatic assembly machine according to the invention. Operations other than those mentioned can be incorporated into the schedule of the automatic machine, such as, for example, flat face milling, as well as trimming of any edges present.

What is claimed is:

1. A method for assembling an aircraft wing, the method comprising:
   a) mounting on an arm of a robot a first tool holder with tools operable to perform a first work operation, wherein the robot is mobile relative to the wing in a plane substantially parallel to the wing;
   b) searching the wing with the robot arm for a first predrilled center hole for an anchor nut;
   c) maneuvering the robot arm to a work position determined by the position of the first predrilled center hole and information in a memory;
   d) carrying out with the robot the first work operation at the work position;
   e) searching with the robot arm for additional predrilled center holes for anchor nuts in a work area in the vicinity of the first predrilled center hole reachable by the robot arm;
   f) carrying out steps c–d at second work positions determined by the positions of the additional predrilled center holes and information in the memory;
   g) moving the robot in relation to the wing to new work areas and carrying out steps b–f for a predetermined number of work areas;
   h) mounting on the robot arm a second tool holder with tools for performing a second work operation; and
   i) executing the second work operation with the robot by following steps b–g, wherein the second work operation is substituted for the first work operation.

2. The method according to claim 1, wherein the assembly comprises at least two of drilling, riveting and fitting of anchor nuts.

3. The method according to claim 1, wherein the robot arm is maneuvered to the new work areas by moving the robot horizontally on a first rail and vertically on a second rail, thereby occupying the new work areas for the robot arm.

4. The method according to claim 1, wherein the memory comprises respective positions of anchor nuts on the wing, dimensions of the predrilled center holes, types of anchor nuts, rivet hole positions in relation to anchor nuts, types of rivets, and dimensions of rivet holes.

5. The method according to claim 4, wherein a program in a central unit reads data from the memory and commands the robot to perform the work operations and execute the program according to data for each specific anchor nut that is read from the memory.

6. The method according to claim 4, wherein the wing unit is divided into work areas, so that data related information on anchor nuts in the memory is arranged according to work areas.

7. A method for assembling an aircraft wing, the method comprising:
   a) mounting on an arm of a robot a first tool holder with tools operable to perform a first work operation, wherein the robot is mobile relative to the wing in a plane substantially parallel to the wing;
   b) searching the wing with the robot arm for a first predrilled center hole for an anchor nut;
   c) maneuvering the robot arm to a work position determined by the position of the first predrilled center hole and information in a memory;
   d) carrying out with the robot the first work operation at the work position;

e) searching with the robot arm for additional predrilled center holes for anchor nuts in a work area in the vicinity of the first predrilled center hole reachable by the robot arm;

f) mounting on the robot arm a second tool holder with tools for performing a second work operation;

g) executing the second work operation with the robot by following steps b–e; and h) moving the robot to new work areas and carrying out steps a–g for a predetermined number of work areas.

8. The method according to claim 7, wherein the assembly comprises at least two of drilling, riveting and fitting of anchor nuts.

9. The method according to claim 7, wherein the robot arm is maneuvered to the new work areas by moving the robot horizontally on a first rail and vertically on a second rail, thereby occupying the new work areas for the robot arm.

10. The method according to claim 7, wherein the memory comprises respective positions of anchor nuts on the wing, dimensions of the predrilled center holes, types of anchor nuts, rivet hole positions in relation to anchor nuts, types of rivets, and dimensions of rivet holes.

11. The method according to claim 10, wherein a program in a central unit reads data from the memory and commands the robot to perform the work operations and execute the program according to data for each specific anchor nut that is read from the memory.

12. The method according to claim 10, wherein the wing unit is divided into work areas, so that data related information on anchor nuts in the memory is arranged according to work areas.

13. A device for carrying assembling an aircraft wing, the device comprising:

a robot comprising an arm;

a first rail arranged alongside a substantially vertically positioned wing, wherein the robot is movable along the substantially parallel to the wing;

a carriage comprising a column mounted in the carriage, wherein the carriage is operable to be moved along the first rail;

a second rail arranged on a side of the column, the robot being movable vertically along the second rail;

a tool holder arranged on the robot arm and operable to be changed between execution of different work operations; and a sensor arranged in the tool holder and operable to determine the exact position for center holes for anchor nuts.

14. The device according to claim 13, further comprising:

ball screw mechanisms operable to maneuver the robot arm.

15. The device according to claim 13, wherein the robot arm reaches a defined work area that constitutes a part of the wing surface.

16. The device according to claim 13, further comprising:

a magazine operable to store tool holders for different work operations, wherein the magazine is located within reach of the robot arm.

17. The device according to claim 13, wherein the tool holder uses tools that perform one work operation.

* * * * *